June 14, 1960 C. R. DAVIDSON, JR., ET AL 2,940,222
TREATING GLASS SHEETS
Filed May 27, 1957

INVENTORS
CHARLES R. DAVIDSON JR.
RUDOLPH L. MALOBICKY and
BY HAROLD E. McKELVEY Oscar L. Spencer
ATTORNEY United States Patent Office
2,940,222
Patented June 14, 1960

2,940,222
TREATING GLASS SHEETS

Charles R. Davidson, Jr., and Rudolph L. Malobicky, Tarentum, and Harold E. McKelvey, Rural Valley, Pa., assignors to Pittsburgh Plate Glass Company, Allegheny County, Pa., a corporation of Pennsylvania Filed May 27, 1957, Ser. No. 661,709

5 Claims. (Cl. 49—84)

This application relates to treating glass sheets and especially concerns a new and improved method and apparatus for handling flat glass sheets that are to be bent into very sharp curvatures and tempered while so shaped.

In producing automobile backlights from flat glass sheets, it has been customary to mount individual flat glass sheets on sectionalized, skeletonized molds comprising mold sections capable of moving into a spread position to support the flat sheets and capable of moving into a closed position to form a curved shaping frame conforming in elevation and outline to the shape desired for the bent sheet. Each mold section is formed of one or more rails that are apertured. The spread molds laden with flat glass are conveyed through a bending lehr of tunnel-like configuration where the temperature of the glass is raised to its softening point. As the glass softens, the mold sections move into the closed mold position and the glass sheets sag to conform to the mold shaping frame provided by the closed mold and thus are converted into bent sheets.

The closed molds supporting the heated bent glass sheets are then conveyed between opposing blasts of tempering fluid such as air which chill the glass surfaces so rapidly that a temperature gradient is established between the glass surfaces and the interior of the sheets. The apertures in the mold rails are utilized for the escape of air blasts impinging on the bottom surface of the supported bent glass sheet to enable fresh cold air to replace the air that has been heated upon contacting the heated sheet.

The prior art skeleton mold rails were either serrated at their glass supporting surface or apertured in close proximity thereto. As long as glass sheets to be tempered were to be bent to rather shallow curvatures, such tempering molds sufficed. However, recently the requirements of automobile manufacturers have necessitated the production of a greater number of tempered glass panels than before. These panels are of greater area and of more severe curvatures than was ever mass produced previously.

Considerable difficulty was encountered in attempting to produce prototypes of these tremendous and severely shaped units, to say nothing of manufacturing them on a mass production basis. Sheets either fractured or else were in such intimate embrace with the mold after tempering that their removal was difficult, if not impossible.

According to the present invention, these troubles were attributed to the location of the apparatus on the bending mold rails of the previous conventional type molds used to produce shallowly bent and tempered glass sheets. It was reasoned that while the glass and mold were heated sufficiently slowly to permit the temperature of the mold rails to equalize, that the rapid chilling required for tempering the bent sheet caused the mold rails to become warped and tighten the intimate contact with the bent glass sheet, sometimes causing the latter to fracture and otherwise making its rapid removal difficult.

Carrying this reasoning further, it was decided that if the longitudinal half of the mold shaping rail which includes the mold shaping surface had more average thermal capacity per unit length than that of the other longitudinal half of the rail, that the sudden chilling would cause the rail to warp away from glass contact temporarily for a period sufficient to permit removal of the bent, tempered glass sheet from the mold.

The mold can then be spread to receive a flat glass sheet, which is heated sufficiently slowly to permit the mold rail temperature to equalize at the glass softening point. The temporary warpage of the mold during loading does not matter since the glass sheet need not register with the mold until it softens to conform to the mold shaping surface.

The present invention will be better understood after reading the description of a typical embodiment of the present invention, which is presented for purposes of illustration rather than limitation.

In the drawings which form part of the description and where like reference numerals refer to like structural elements, Figure 1 is an elevational view of a sectionalized bending mold constructed according to the present invention in its open position to support a sheet of glass for bending, with parts shown in phantom.

Figure 1:
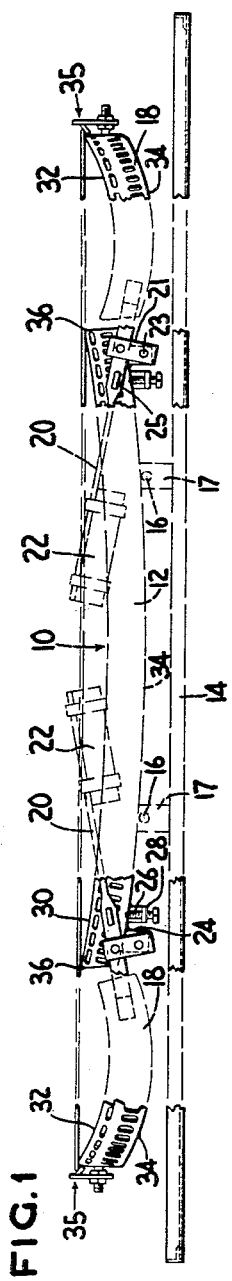

Referring to the drawings, a glass bending mold 10 is shown comprising a central mold section 12 carried by a mold carrying frame 14 by means of cross rods 16 which rest at their extremities on frame support posts 17. Wing sections 18 flank the central mold section 12. The latter are provided with inboard extensions in the form of lever arms 20 to which are attached counterweights 22. Lever arms 20 are also provided with reinforcement tabs 21, the bottom of which make pivotable attachment with bearing rods 23 carried by tabs 24 extending from the under surface of the central molding section 12.

Figure 2:
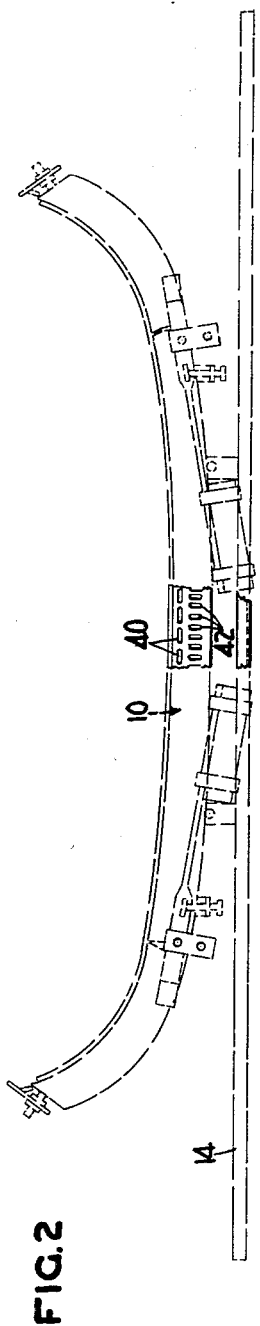
Figure 2 is an elevation of the mold of Figure 1 in its closed position supporting a curved glass sheet.

Each wing section 18 is rotatable relative to the center section 12 by virtue of the pivotable connection between the reinforcement tabs 21 and the bearing rods 23. The counterweights 22 tend to rotate the wing sections 18 about bearing rods 23 into the closed mold position depicted in Figure 2 from the open mold position shown in Figure 1.

Each lever arm is provided with a ledge 25 engageable with an adjustable screw 26 screw threaded through an apertured angular plate 28 fixed to the center section 12 to prevent excessive rotation of the wing sections relative to the center section.

Center mold section 12 comprises a pair of spaced rails, each having an upper edge providing an upper shaping surface 30. Each wing section 18 is formed of a reversely curved rail disposed on edge so that its upper edge forms an upper shaping surface 32. The bottom edge of each rail furthest removed from the glass is depicted by reference character 34.

The molds are also provided with suitable supporting members 35 attached to the outboard extremities of the wing sections 18. The rails of the center section 12 terminate at outboard extremities 36. When flat glass sheets are mounted on the molds for bending, the wing sections 18 are rotated in outboard directions so that the flat glass is supported at its extremities on supporting members 35 and intermediate its extremities on the longitudinal extremities 36 of the center section 12. When the glass sheet is heat softened, the counterweights 22 rotate the wing sections 18 in an inboard direction to provide a substantially continuous mold frame. The upper shaping surfaces 30 and 32 of the mold section rails provide an upper surface for the frame that conforms in elevation and outline to the shape desired for the bent glass sheet. Thus, each mold rail is disposed edgewise to support at least a portion of the curved glass sheet along its edge 30 or 32 which conforms in elevation and outline to the shape desired for a portion of the bent glass sheet.

Each of the mold sections is provided with apertures to facilitate the escape of air from the surface of the glass for tempering the glass sheets after bending. This provision of apertures in the mold section rails enables glass sheets to be both bent and tempered without removal from the bending mold.

Figure 4:
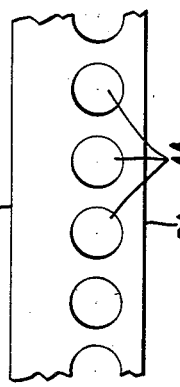
Figure 4 is an enlarged fragmentary view of an alternate embodiment of mold rail structure.
Figure 3:
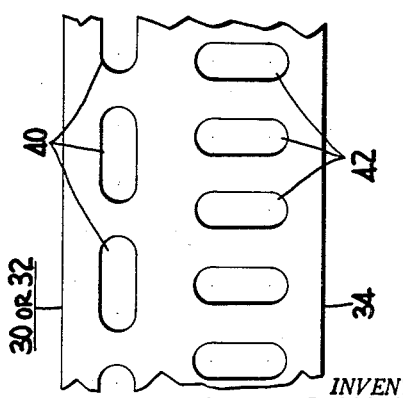
Figure 3 is an enlarged fragmentary view of a portion of a mold rail forming part of the bending mold of Figures 1 and 2.

Referring to Figures 3 and 4 for specific embodiments of the present invention, a portion of a rail of a mold section 12 or 18 is shown with its upper shaping surface 30 or 32 and its edge 34 remote from glass contact.

In Figure 3, apertures 40 are elliptical and aligned horizontally in relatively spaced relation along the portion of the mold section adjacent the edge 30 or 32 which forms part of the mold shaping surface. The same sized apertures 42 are aligned vertically and spaced more closely together in the portion of the mold rail adjacent edge 34. The relative disposition of the apertures 40 and 42 provides the mold rail with an average thermal capacity per unit length along its longitudinal half adjacent the glass engaging edge 30 or 32 exceeding its average thermal capacity per unit length along its longitudinal half adjacent edge 34.

In Figure 4, the average thermal capacity per unit length along the longitudinal half of the mold rail adjacent its glass engaging edge 30 or 32 is made to exceed its average thermal capacity per unit length along its longitudinal half adjacent the edge 34 remote from the glass by drilling apertures 44 adjacent edge 34.

When glass sheets are to be bent and tempered on such molds, they are conveyed through a bending lehr of tunnel-like configuration wherein the glass sheet and the mold are heated comparatively slowly to glass softening temperatures so that the upper and lower longitudinal halves of the mold rails are equal in temperature. The latter moves into its closed position since the glass sheet is unable to maintain the mold in its open position once it has softened. Thus, the glass sheet sags to an unwarped or normal shaping surface of the closed mold.

The closed mold supporting the bent glass sheet is then conveyed beyond the bending lehr into a tempering chamber where the glass sheet surfaces are chilled by exposure to opposing blasts of cooling fluid such as air. These cause the glass surfaces to freeze instantly to conform to the upper shaping surface of the unstressed mold.

Figure 5:
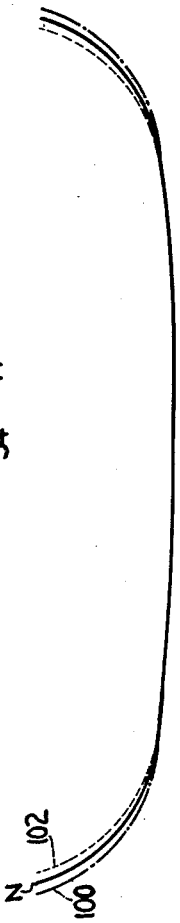
Figure 5 is a schematic view of the normal elevation of the curve provided by the glass shaping surface of a glass sheet bending mold and a comparison of temporary warpages resulting from suddenly chilling prior art molds and molds constructed according to the present invention.

The thermal capacity of the glass per unit surface area is much less than that of the mold, so that the effect of the air blasts on the glass is relatively instantaneous compared to that on the mold. After the bent glass sheet surfaces have chilled to their desired shapes, the air blasts cause the lower longitudinal half of each mold rail to cool more rapidly than its upper longitudinal half. The air blasts cool the mold at such a rate that its upper longitudinal half which includes its shaping surface is reduced to a temperature higher than its lower longitudinal half which includes portions of the mold remote from its shaping surface. Since cooling is accompanied by thermal contraction, the differential contraction of the different portions of the mold rails causes the mold to warp away from the glass which has frozen to conform to the shaping surface of the unstressed mold, depicted by N, to the configuration depicted by the dot-dash lines 100 of Figure 5. This is the opposite warpage from that inherent in previous tempering molds and depicted by the dash lines 102 of Figure 5.

Since high production requires prompt removal of the bent tempered sheets from the mold, the warpage incidental to molds following the present invention facilitates their removal if made promptly. On the other hand, prior art molds were never suitable for mass production of severely bent tempered sheets because their prompt removal could be made only with difficulty if they were fortunate enough to escape fracture.

While the present invention has been described in connection with a horizontal mold of concave elevation, it is understood that the principles of the present invention are equally suitable for convex molds wherein the glass sheet is sagged to conform about the convex configuration of a convex skeleton mold. These may be accomplished by distributing the thermal capacity of the mold so that its portion adjacent the glass has a higher average thermal capacity per unit length than that of its portion remote from the glass, thus facilitating warpage of the mold away from the bent glass sheet.

Other modifications within the scope of the appended claims will become obvious in the light of the foregoing disclosure.

What is claimed is:

1. A method of mass producing bent tempered glass sheets comprising mounting a flat glass sheet on a bending mold having a shaping surface conforming to that desired for the bent glass sheet and capable of warping to a greater extent than the glass sheet at temperatures below the glass softening point, exposing the glass sheet and bending mold to a hot atmosphere sufficient to soften the glass sheet so that it conforms to said shaping surface, then rapidly cooling the sheet and the mold at a rate such that its shaping surface is reduced to a temperature higher than that of portions of the mold remote from the shaping surface and to freeze the surfaces of the bent glass sheet in conformance with the shaping surface, thereby temporarily causing the mold to warp away from the tempered bent glass sheet after the latter has been frozen to conform to its desired shape, and removing the tempered, bent glass sheet after it has been frozen to conform to its desired shape and while the mold is temporarily warped.

2. The method according to claim 1, wherein the flat glass sheet is bent to a complex curvature, which includes a sharp radius curve, before rapidly cooling the glass laden mold.

3. A skeleton mold for supporting a glass sheet for thermal treatment during which the sheet is first bent to sharp curvatures and then tempered by sudden chilling, said mold comprising an apertured mold rail, said mold rail being disposed edgewise to support at least a portion of the curved glass sheet along one edge, said one edge conforming in elevation and outline to the shape desired for a portion of the bent glass sheet, said mold rail comprising a longitudinal half adjacent said one edge and a longitudinal half remote from said one edge, wherein a greater proportion of the longitudinal half remote from said one edge than that of the longitudinal half adjacent said one edge is apertured.

4. A skeleton mold for supporting a glass sheet for thermal treatment during which the sheet is first bent to sharp curvatures and then tempered by sudden chilling, said mold comprising a plurality of molding members relatively movable into a spread position to support a flat glass sheet for bending and into a closed mold position to provide a substantially continuous shaping surface conforming in elevation and outline to the shape desired for the bent glass sheet, each molding member comprising an apertured mold rail, each mold rail being disposed edgewise to support a portion of the curved glass sheet along one edge, said one edge conforming in elevation and outline to the shape desired for a portion of the bent glass sheet, each said mold rail comprising a longitudinal half adjacent said one edge and a longitudinal half remote from said one edge, wherein a greater proportion of the longitudinal half remote from said one edge than that of the longitudinal half adjacent said one edge is apertured.

5. The improvement according to claim 4, wherein the skeleton mold provides a shaping surface that is concave in elevation.

References Cited in the file of this patent

UNITED STATES PATENTS

| | | |
|---|---|---|
| 2,003,383 | Miller | June 4, 1935 |
| 2,251,159 | Owen | July 29, 1941 |
| 2,327,883 | Galey | Aug. 24, 1943 |
| 2,646,647 | Bamford et al. | July 28, 1953 |
| 2,677,918 | Bird et al. | May 11, 1954 |
| 2,691,854 | Rugg | Oct. 19, 1954 |
| 2,736,140 | Black | Feb. 28, 1956 |
| 2,805,520 | Black | Sept. 10, 1957 |

UNITED STATES PATENT OFFICE

CERTIFICATION OF CORRECTION

Patent No. 2,940,222                                         June 14, 1960

Charles R. Davidson, Jr., et al.

It is hereby certified that error appears in the above numbered patent requiring correction and that the said Letters Patent should read as corrected below.

Column 1, line 62, for "apparatus" read -- apertures --.

Signed and sealed this 25th day of April 1961.

(SEAL)
Attest:

ERNEST W. SWIDER                                       DAVID L. LADD
Attesting Officer                                       Commissioner of Patents